United States Patent Office 3,234,388
Patented Feb. 8, 1966

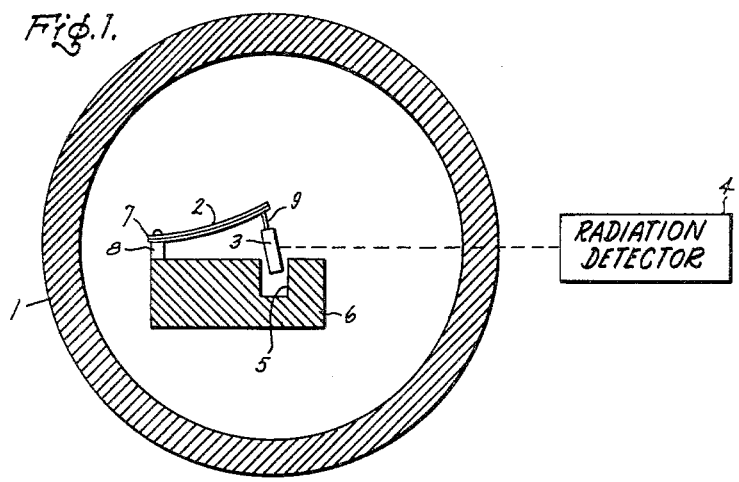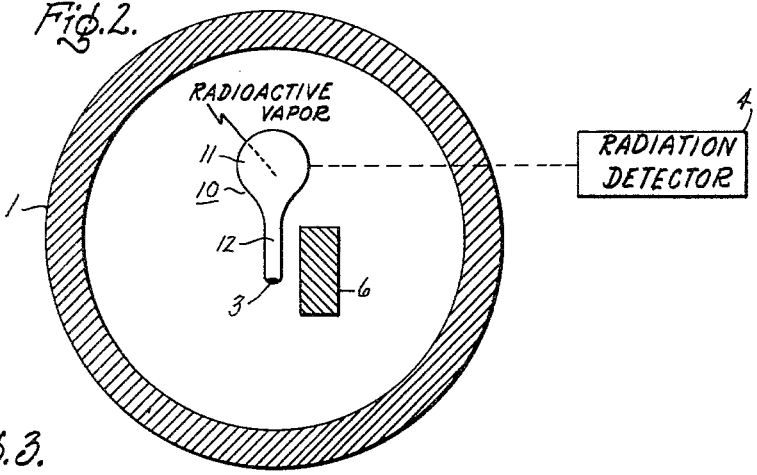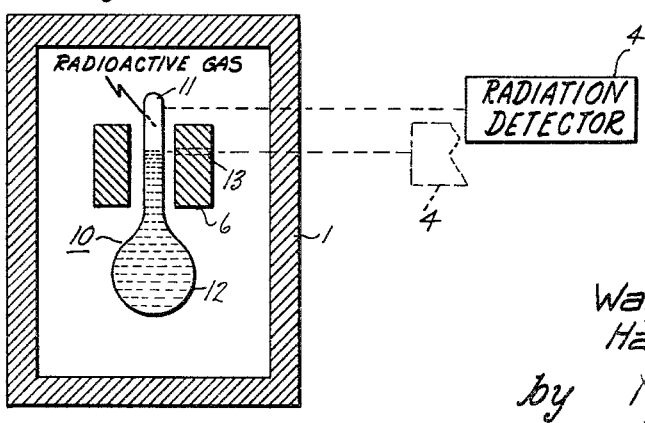

3,234,388
RADIOACTIVE APPARATUS FOR MEASURING
TEMPERATURE
Warner W. Schultz, Schenectady, and Harvey D. Briggs,
Middleburg, N.Y., assignors to General Electric Company, a corporation of New York
Filed June 22, 1962, Ser. No. 204,355
4 Claims. (Cl. 250—83.3)

Our invention relates to a method and apparatus for measuring temperature and, in particular, to an apparatus for measuring temperature in inaccessible regions by utilizing the phenomenon of radioactivity.

A fairly common problem in the measurement of temperature occurs when a zone whose temperature is to be measured is inaccessible or remotely located. A conventional method to accomplish remote temperature measurement employs thermocouple devices. However, in many situations thermocouples are not useful. For example, it is inconvenient to bring thermocouple leads out of rotating electrical equipment and the problem is further aggrevated when such factors as high rotational speeds and vibration are present. As another example, in transformers the presence of high voltage may in like manner make it very undesirable to employ conventional temperature measuring techniques. One possible solution to the problem lies in modifying the equipment wherein the temperature is to be measured, but in many instances the modification would alter the inherent characteristics of the equipment, therefore, this solution is generally inappropriate. Further, there are limitations on the range of temperatures that can be measured with conventional temperature measuring devices. Finally, conventional devices for measuring temperature in inaccessible or remote regions have the limitation of requiring a physical contact with the part or area whose temperature is to be measured. Since conventional measuring techniques cannot be employed satisfactorily to measure temperature in remote or inaccessible regions for many applications, a need exists for solving this problem by providing a new apparatus and method for measuring temperature.

Therefore, one of the principal objects of our invention is to develop a new and improved apparatus and method for measuring temperature in an inaccessible or remote region.

Another important object of our invention is to develop a new and improved apparatus and method for measuring temperature whereby no physical contact is required between the region whose temperature is measured and the temperature indicating device.

Still another important object of our invention is to develop a new and improved apparatus and method for measuring temperature that utilizes the phenomenon of radioactivity.

Briefly stated, and in accordance with one aspect of our invention in meeting the objects enumerated above, we provide a temperature measuring apparatus consisting further objects and advantages thereof, may best be understood a radioactive source positioned in the remote or inaccessible region whose temperature is to be measured, a radiation detector positioned in a more accessible region, and a radiation shield positioned therebetween in a manner such that the radiation transmitted from the source to the detector becomes a function of the temperature in the remote region. The method for determining the temperature in the remote region consists in positioning the radioactive source, shield, and detector at predetermined points whereby a known function of temperature versus detected radiation is obtained, reading the radiation measured by the detector, and comparing the measured radiation with the known function of temperature versus detected radiation.

The features of our invention which we desire to protect herein are pointed out with particularity in the appended claims. The invention itself, however, both as to its organization and method of operation, together with further objects and advantages thereof, may best be understood by reference to the following description taken in connection with the accompanying drawing, wherein like parts in each of the several figures are identified by the same reference character and wherein:

FIGURE 1 is an elevation view partly in section of a temperature measuring apparatus employing the principle of differential expansion of two solids with temperature to produce a known function of temperature versus detected radiation;

FIGURE 2 is an elevation view partly in section of a second embodiment of a temperature measuring apparatus employing the principle of vapor pressure change with temperature to produce a known function of temperature versus detected radiation; and FIGURE 3 is an elevation view partly in section of a third embodiment of a temperature measuring apparatus employing the principle of expansion of a liquid and compression of a radioactive gas with rising temperature to produce a known function of temperature versus detected radiation.

Referring particularly to the apparatus illustrated in FIGURE 1, there is shown a very long rotating hollow shaft 1 wherein the temperature at an interior region thereof is to be measured. A conventional temperature sensing element 2 and a radioactive source 3 connected thereto are positioned and retained in any suitable manner at the center of rotating shaft 1. As the temperature of the region wherein temperature sensing element 2 and source 3 are located increases or decreases, more or less of the radioactive source is exposed to a radiation detector 4 placed at a predetermined distance from the center of shaft 1. Temperature sensing element 2 may be a bimetallic strip, for example, with radioactive source 3 attached to one end thereof. The differential expansion of the two metals comprising the bimetallic strip causes radioactive source 3 to be withdrawn from a hollow portion 5 in a radiation shield 6 as the temperature increases, thereby increasing the radiation incident upon detector 4. Bimetallic strip 2 has one end 7 retained in fixed relationship to shield 6 by means of connecting member 8 which further acts as a pivot point about which the end of the bimetallic strip containing radioactive source 3 may move. Source 3 is contained within a source capsule which can be welded, soldered, or brazed, directly to bimetallic strip 2 or indirectly by means of an interconnecting member 9 suitably connected between the end of strip 2 and source 3.

As a specific example of the FIGURE 1 embodiment, a bimetallic strip one centimeter wide and nine centimeters long with a cobalt-60 source in needle form nine millimeters long attached to one end of the strip may be used. The bimetallic strip may be prestressed so that no bending occurs until a particular temperature is attained within region 1. With this arrangement, including a prestress, the apparatus may have a temperature measuring range from 60° C. to about 140° C. Thus, the prestress prevents any withdrawal of source 3 from shield 6 until the minimum temperature of 60 degrees is reached, and the cobalt needle 3 is completely withdrawn from its shield at 140 degrees. The radioactivity of this cobalt needle is approximately 100 microcuries. Therefore, a measurement can be made by a person at a distance as small as 5 feet from this source without exceeding the allowed radiation tolerance for a noncontrolled area. The choice of bimetallic strips and strip prestress determine the temperature range which may be measured. Thus, a narrow or wide temperature range, depending upon the bimetallic strip employed, can be achieved. It should be readily apparent that radioactive sources other than cobalt-60 may be utilized, the only requirement being that sufficient radiation be emitted by a very small mass of the material. The radiation detector 4 may comprise any of the conventional radiation measuring devices such as an ionization chamber, scintillation counter, proportional counter, or a Geiger counter, the particular device employed being dependent on the type of radiation emitted by source 3, preferably being gamma rays or beta particles. Radiation shield 6 may be made of lead or other metals.

The method for measuring the temperature within region 1 includes the following steps. A particular radioactive source is selected which provides a measurable amount of radiation at a predetermined distance from the region whose temperature is to be measured. Considerations such as the types and thicknesses of materials encountered between radioactive source 3 and radiation detector 4 also determine the type and quantity of source to be used. The selection of the particular bimetallic strip 2 is governed by the temperature range to be measured since the differential expansion and resulting curvature of specific bimetallic strips are known. A calibration curve of radiation detector counting rate and measured temperature is next obtained. The radiation detector may conveniently be calibrated directly in degrees of temperature in the case of permanent installations if the apparatus is used to continuously measure the temperature of only one specific region. In general, however, the apparatus which is portable, will be employed to measure temperatures at different regions. Therefore, calibration curves for a specific radioactive source and a specific radiation detector located at predetermined distances therefrom are obtained experimentally for varying thicknesses of intervening materials located therebetween, especially for metals such as iron, steel, and copper which are commonly encountered. The assembly comprising bimetallic strip 2, source 3, and shield 6 is then positioned in the inaccessible region whose temperature is to be measured. The radiation detector 4 is then positioned in an accessible region at a predetermined distance from the source as dictated by the calibration curves and health hazard considerations. The temperature in the inaccessible region may then be read either directly on the radiation detector in the case of permanent installations, or may be determined by comparing the measured radiation counting rate with the calibration curve. In either event, the radiation detector measurement can be recorded on a suitable chart recorder for continuous measurement of the temperature, if a permanent temperature record is desired.

FIGURE 2 depicts a second embodiment of our invention. In this apparatus, the principle of vapor pressure change of a radioactive material with temperature is employed as the temperature sensing element to produce a known function of temperature versus measured radiation. Thus, the temperature sensing element of FIGURE 2 consists of an evacuated enclosure indicated as a whole by numeral 10, which may comprise a bulb part 11 and a lower part 12 wherein has been placed a small amount of radioactive material 3. A radiation shield 6 is placed between lower part 12 and detector 4 to prevent incident radiation from source 3 from reaching detector 4. Shield 6 may be placed in contact with the outer edge of lower part 12, or can be placed at any point between lower part 12 and detector 4, including points exterior to the region bounded by surface 1 if space limitations are a consideration. Radiation shield 6 may comprise a member that merely intervenes between lower part 12 and detector 4 as illustrated, or be a member that substantially surrounds lower part 12, thereby providing more adequate shielding from source 3 in all directions. As the temperature within region 1 rises, the vapor pressure in enclosure 10 also rises, causing the radiation counting rate as measured by radiation detector 4 to increase. Since vapor pressure versus temperature characteristics are known for many elements and compounds, and the dimensions of the evacuated enclosure are known, it is possible to calculate the temperature from the counting rate data. This information can be put into the form of a calibration curve wherefrom the temperature can be read directly for any counting rate observed. In like manner, as described in relation to the embodiment of FIGURE 1, preliminary curves of temperature versus counting rate for a number of shielding thicknesses and other intervening obstructions can be obtained experimentally rather than calculating the temperature from the counting rate data.

The use of penetrating radiation such as gamma rays, X-rays, and high energy beta particles permits detector 4 to be located outside of the region whose temperature is to be measured. The choice of radioactive material 3 used depends on the temperature range to be covered. Vapor pressure tables for inorganic compounds reveal that a wide range of temperature can be measured by this device. By combining several enclosures, each enclosure containing a different material and being adapted to function over a prescribed temperature range, one apparatus can measure over a very wide range of temperature. The radioactive material must also have a suitable half-life and emit radiation of suitable energy. A wide variety of elements and compounds may be employed. For example, the vapor pressure of cesium changes from 1 mm. at 279° C. to 760 mm. at 690° C. Cesium-137 has a half-life of 30 years and emits gamma rays having an energy of 0.662 m.e.v. Tin has a vapor pressure of 1 mm. at 1492° C. and 760 mm. at 2270° C. Tin-113 has a half-life of 112 days and emits gamma rays of 0.393 m.e.v. Tungsten has a vapor pressure of 1 mm. at 3990° C. and 760 mm. at 5927° C. Tungsten-185 has a half-life of 75 days and emits beta particles of 0.428 m.e.v. Stannic hydride has a vapor pressure of 1 mm. at −140° C. and 760 mm. at −52.3° C. Thus, from these few examples, it is evident that a wide range of temperatures can be covered.

The radioactive material 3 in its vapor state may condense on the walls of bulb part 11 of the evacuated enclosure as the temperature is lowered. To prevent this condensation, bulb part 11 is made of a material which maintains a temperature higher than at lower part 12, thus condensing the material within lower part 12. This may be accomplished by making lower part 12 of a material that is a good heat conductor and also a good radiator, such as a metal which will not melt within the temperature range being measured. Bulb part 11 may be made of glass, quartz, or similar material. This combination of different materials for bulb part 11 and lower part 12 provides a fast response apparatus.

FIGURE 3 illustrates a third embodiment of a temperature measuring apparatus that employs a radioactive temperature indicating device. This third embodiment employs the principle of expansion of liquid and corresponding compression of a radioactive gas, both contained within the same evacuated enclosure, with rising temperature. An evacuated enclosure, designated as a whole by numeral 10, may in this particular embodiment be an ordinary mercury thermometer, with lower part 12 filled with mercury and upper part 11 filled with a radioactive gas. Other liquids which do not vaporize or solidify at the temperatures encountered may also be used in place of the mercury. Krypton-85 is a suitable radioactive gas to use in this application. It has a half-life of 10.27 years and emits a gamma ray of 0.54 m.e.v. Shield 6 is preferably placed completely around evacuated enclosure 10 and is adapted to permit the radiation detector 4 to sense only the radioactive gas in the top of the capillary, the uppermost portion of evacuated enclosure 10. As the temperature within the remote or inaccessible region included by boundary 1 rises, the mercury expands and the radioactive gas is correspondingly compressed, thus increasing the density of the gas and increasing the counting rate at detector 4. Different temperature ranges are measured by employing liquids other than mercury.

The apparatus illustrated in FIGURE 3 is also suitable for control purposes. An aperture made through shield 6 at a point 13 permits an abrupt change to occur in the radiation sensed by detector 4 at a selected temperature. The selected temperature is determined by the appearance of the demarcation line separating the uppermost level of the liquid and the lowermost level of the radioactive gas at the aperture. Thus, with increasing temperatures, an abrupt change from a measurable value of radiation to zero would occur, while for decreasing temperatures, at the selected temperature an abrupt change from zero radiation to a measurable radiation would occur. The top of the capillary would preferably be shielded when the apparatus is used for this control purpose although this requirement is not absolutely necessary if provisions are made to read the radiation detector with accuracy sufficient to determine both the temperature at any moment and also the additional change sensed when the demarcation line between the radioactive gas and liquid passes the aperture within the shield.

From the foregoing description, it can be appreciated that our invention makes available a new apparatus and method for measuring the temperature in a remote or inaccessible region which has the advantage of not having any physical contact with the part or area wherein the temperature is to be measured. By the use of radioactive techniques, conventional temperature sensing elements and one of several physical principles, a temperature indicating device, capable of being read at some distance with no connecting wires or mechanism is obtained.

The radiation emitted by a radioactive material permits the temperature to be determined even though the radiation must penetrate substantial thicknesses of material and the temperature is read both accurately and with a fast response time.

Having described a new method and three embodiments of a new apparatus for measuring the temperature of a remote or inaccessible region in accordance with our invention, it is believed obvious that other modificatons and variations of the invention are possible in light of the above teachings. For example, the partcular radioactive material, radiation shield, and radiation detector may be selected from any of the conventionally known types; the selections being determined by factors such as space limitations, cost, and temperature range to be encountered. Further, other physical principles, such as expansion of a radioactive solid or liquid with rising temperature may be employed, the selection of physical principle being determined by the particular application involved. It is therefore, to be understood that changes may be made in the particular embodiment of our invention described which are within the full intended scope of the invention as defined by the following claims.

What we claim as new and desire to secure by Letters Patent of the United States is:

1. A temperature measuring apparatus comprising
   a radioactive source positioned in a remote region wherein the temperature is to be measured,
   a radiation shield, said source being disposed entirely within said shield at a predetermined low temperature,
   a bimetallic strip having one end thereof operatively coupled to said source, said bimetallic strip being responsive to increased temperatures for withdrawing said source from said shield, the degree of withdrawal being a function of the temperature in the remote region, said source upon withdrawal thereby transmitting radiation as a function of the temperature, and
   a radiation detector positioned at a predetermined distance from said source and external to the remote region for measuring the transmitted radiation and thereby determining the temperature in the remote region.

2. A temperature measuring apparatus comprising
   an evacuated enclosure positioned in a relatively inaccessible region, a liquid disposed within a lower portion of said enclosure, a radioactive gas disposed within an upper portion of said enclosure,
   a radiation detector positioned in a more accessible region, the radiation sensed by said detector being a measure of the temperature in said inaccessible region, and
   a radiation shield positioned between said enclosure and detector whereby radiation from the radioactive gas in the top part of the upper portion of said enclosure is sensed by said detector.

3. A temperature measuring apparatus comprising
   an evacuated enclosure positioned in a relatively inaccessible region, a liquid disposed within a lower portion of said enclosure, a radioactive gas disposed within an upper portion of said enclosure, said gas being compressed by said liquid expanding with rising temperature, said gas having a predetermined increase in density in response to a predetermined temperature rise in said inaccessible region,
   a radiation detector positioned at a predetermined distance from said enclosure and located in a more accessible region for determining the temperature in said inaccessible region by measuring radiation transmitted from the radioactive gas in said enclosure, and
   a radiation shield arranged in such a manner between said enclosure and detector whereby radiation is transmitted only from the radioactive gas in the top part of the upper portion of said enclosure.

4. A control device for sensing a specific temperature comprising
   an evacuated enclosure positioned in a relatively inaccessible region, a liquid disposed within a lower portion of said enclosure, a radioactive gas disposed within an upper portion of said enclosure, said gas subjected to a predetermined compression by a predetermined expansion of said liquid in response to a predetermined temperature rise in the surrounding atmosphere,
   a radiation detector positioned at a predetermined distance from said enclosure for measuring radiation transmitted from the radioactive gas in said enclosure, and
   a radiation shield with an aperture therein, said aperture positioned in such a manner whereby said detector senses an abrupt change in the radiation through said aperture at the specific temperature, said abrupt change being effected by the demarcation line between the liquid and the radioactive gas passing across the region of said aperture.

References Cited by the Examiner

UNITED STATES PATENTS

| 2,652,497 | 9/1953 | Miller | 250—43.5 |
| 2,714,668 | 8/1955 | Zinn | 250—83.1 |
| 2,745,969 | 5/1956 | Keeler | 250—106 |
| 2,968,720 | 1/1961 | Hull | 250—43.5 |
| 3,024,364 | 3/1962 | Wanetick | 250—106 |
| 3,090,862 | 5/1963 | Berk | 250—106 |
| 3,123,714 | 3/1964 | Chope | 250—43.5 |

RALPH G. NILSON, *Primary Examiner.*

JAMES W. LAWRENCE, *Assistant Examiner.*